Patented June 24, 1952

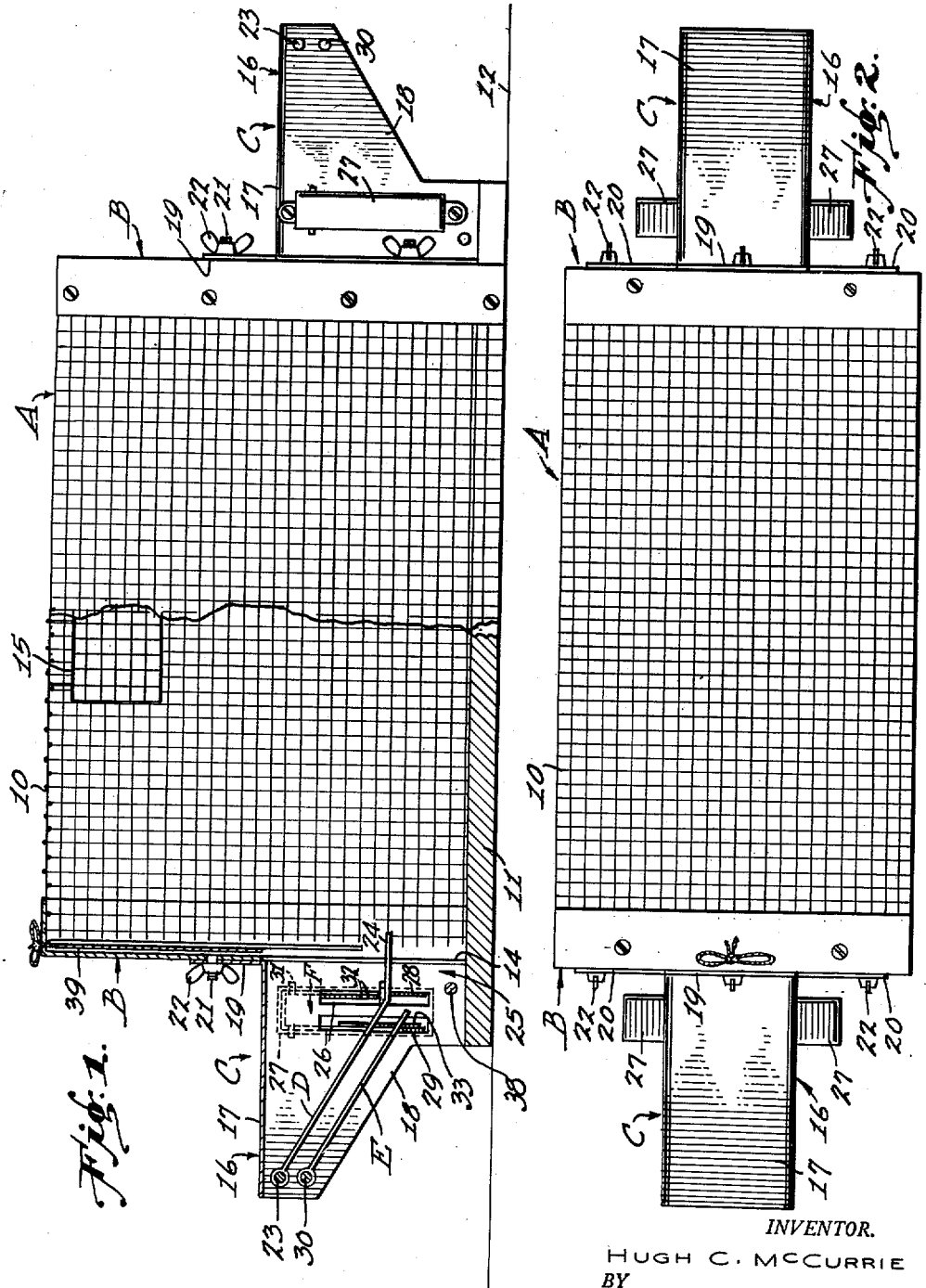

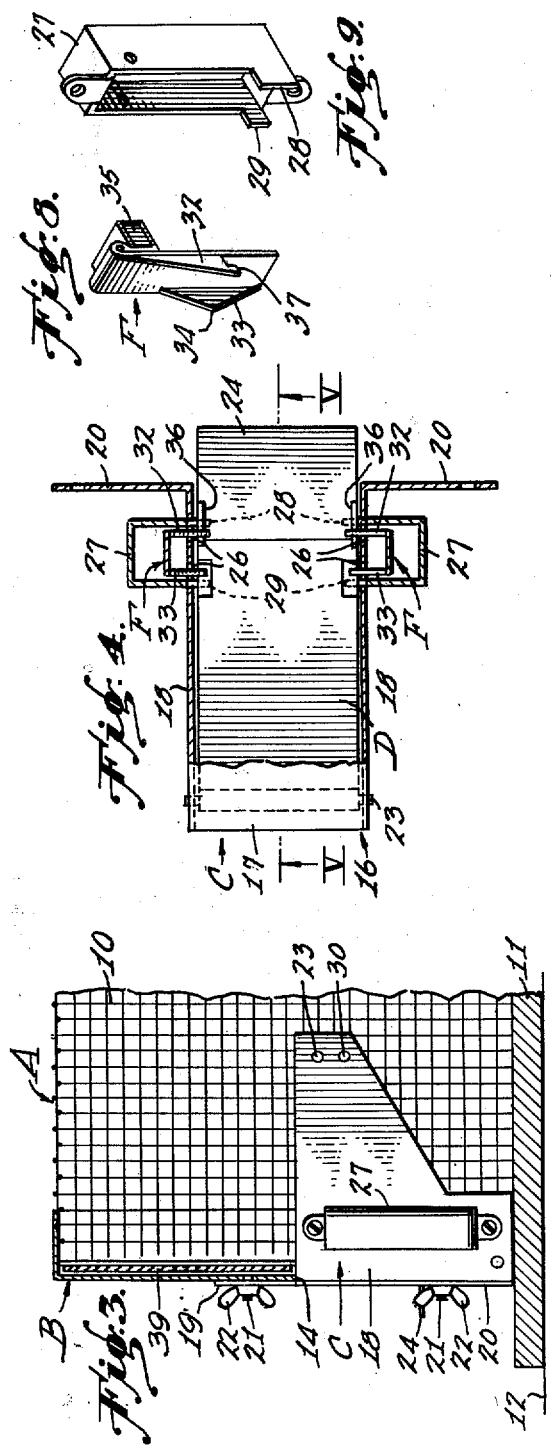

2,601,622

UNITED STATES PATENT OFFICE 2,601,622

CAGE-TYPE RATTRAP

Hugh C. McCurrie, Morgan Hill, Calif.

Application August 1, 1950, Serial No. 177,016

9 Claims. (Cl. 43—66)

1

The present invention relates to improvements in a cage-type rat trap. It consists of the combinations, constructions and arrangement of parts, as hereinafter described and claimed.

An object of my invention is to provide a cage-type rat trap that is designed in such a manner as to take full advantage of the natural habits of a rat, encouraging the rat to enter. Presumably, a rat will be less cautious when it is on the floor or ground outside the cage, and the entrance opening leading into the cage is arranged with an unobstructed space into which the rat can insert at least its head while endeavoring to gain access.

It is proposed in this invention to provide a rat trap having a normally-locked door, which is arranged to form a partial closure over the entrance opening of the cage. Sufficient space is provided between the door and the floor of the cage to allow the rat to partially enter. As the rat endeavors to gain access, the door is unlocked automatically by the rat to permit it to pass. However, as soon as the rat enters the cage, its escape is prevented by the door returning again to its normally-locked position.

Moreover, I propose to provide a cage-type rat trap adapted to have a plurality of self-locking one-way entrance devices attached thereto. These devices are removable when time comes to destroy the trapped rats.

As a further object, I provide a cage-type rat trap in which the space defined between the floor of the cage and the normally-locked door may be altered readily, depending upon the size of the rats intended to be trapped. The construction is such as to assure unlocking of the door by the rat itself as it attempts to enter, and at the same time prevent escape of the rat after it has once entered the cage.

Another object of the invention is to detachably connect the several one-way entrance devices to the cage so that they may be removed and inserted into the interior of the cage during shipment of the trap.

As a still further object, I provide a cage-type rat trap that is relatively simple in construction, yet durable and efficient for the purpose intended.

Other objects and advantages will appear as the specification continues. The novel features of the invention will be pointed out in the claims hereunto appended.

Drawings

For a better understanding of my invention, reference should be had to the accompanying drawings, forming part of this application, in which:

Figure 1 is a side elevational view of my cage-type rat trap, portions being shown in section;

Figure 2 is a top plan view thereof;

Figure 3 is a fragmentary vertical sectional view of a portion of the cage, disclosing one of the self-locking trap devices bolted inside of the cage to conserve space in shipment;

Figure 4 is a horizontal sectional view taken through a detached trap device, along the line IV—IV of Figure 5;

Figure 5 is a vertical sectional view of the same trap device taken along the line V—V of Figure 4;

Figure 6 is a transverse sectional view taken along the plane VI—VI of Figure 5;

Figure 7 is an isometric view of the door and unlocking member that I employ;

Figures 8 and 9 are isometric views of a locking member and a housing for that member, respectively.

While I have shown only the preferred form of my invention, it should be understood that various changes, or modifications, may be made within the scope of the appended claims without departing from the spirit thereof.

Detailed description

In carrying my invention into practice, I provide a cage indicated generally at A. This cage may be made of any suitable size and material. As shown, the cage includes a wire mesh housing 10 having plates B secured to opposing ends thereof, and a bottom 11 extending beyond the ends of the cage. This bottom is adapted to rest directly upon the floor or ground 12, as suggested in Figures 1 and 3 of the drawings.

The end plates B are fashioned with entrance openings 14 through which the rat, or other animal, finally gains access to the interior of the cage. For attracting the rat, a basket 15 for holding bait is disposed within the confines of the cage.

A self-locking one-way entrance trap device designated generally at C is removably detached over each of the entrance openings 14. It will be appreciated, of course, that the number of such trap devices may be increased, or decreased, as desired, depending upon the holding capacity of the cage. As illustrated, one of these devices is arranged at each end of the cage and are identical with one another.

It will be observed that each trap device C is formed with a canopy-like shield 16, which includes a top wall 17 having depending sides 18.

When abutted against the end plates B, the sides 18 rest upon the bottom 11 of the cage. For detachably fastening the trap devices C in place, each of these devices has an upstanding flange 19 and laterally-projecting flanges 20. Bolts 21 and wing nuts 22 are employed for securing these flanges to the end plates B.

Figures 1 and 2 show both trap devices C bolted to the exterior of the cage in positions they occupy while rats, or the like, are being trapped. Turning to Figure 3, the trap device disclosed therein has been turned end-for-end and inserted through the entrance opening 14 so as to project into the interior of the cage during shipment. However, the same flanges, bolts and wing nuts are employed for holding the trap in shipping position.

Next, the construction of one of the trap devices C will be set forth in detail. An inclined door D has its upper end swingably secured to the sides 18 of the canopy shield by a pin 23. The free lower end 24 of this door projects inwardly through the entrance opening when the trap is secured exteriorly of the cage, as in Figure 1.

Normally, the door D occupies the inclined position illustrated in Figures 1 and 5, thus forming a partial closure over the entrance opening 14 through which the rat must pass before reaching the interior of the cage. However, a space 25 is provided between the free end 24 of the door and the bottom 11, even when the door is in its normal position (see Figure 1). This space is sufficiently large to permit the rat to at least partially move its head through the entrance opening 14. It serves as an inducement for the rat to push its head underneath an unlocking member E, without the rat's whiskers coming in contact with the trap. The rat can go partly in and then withdraw without injury, and thereafter try again to enter.

It will be noted from Figures 4 to 6, inclusive, that a pair of vertical slots 26 are fashioned in each depending side 18 of the shield 16. Housings 27 are mounted over these slots on the exterior surfaces of the sides 18. Each housing has a stop 28 projecting through one of the slots 26 to arrest downward movement of the door D when the latter reaches its normal position. Moreover, each of these housings is provided with a second stop 29 that limits downward movement of the unlocking member E. The latter has its upper end swingably secured by a pin 30 to the depending sides 18 of the shield.

The door D and unlocking member E are arranged parallel with one another when in normal position, resting on their respective stops. Both slope downwardly toward the entrance opening 14.

Within each housing 27 is mounted a locking member designated generally at F, one of which is shown in isometric in Figure 8. Each locking member is swingably supported at its upper end by a pin 31, and has a hook-shaped detent 32 projecting through one of the slots 26 so as to normally overlie the lower portion of the door D, thus preventing the door from being opened.

In its structural features, each locking member F is further provided with a double-bevelled cam 33, which projects through the other vertical slot 26 with the high point 34 of this cam disposed above the unlocking member E. Thus when a rat pushes its head underneath the unlocking member E, the latter will engage with the cams 33, forcing the locking members F outwardly and withdrawing the detents 32 from over the door D.

Further movement of the rat forwardly will result in swinging both the unlocking member E and the door D upwardly, allowing the rat to gain access to the interior of the cage. Thereupon, the door D and member E will descend, coming to rest upon their respective stops 28 and 29. Counterweights 35 (see Figures 6 and 8) will swing the locking members F inwardly, bringing the detents over the door to prevent escape of the rat.

The door D has upstanding edge flanges 36 thereon, which are positioned underneath the hooks 37 of the detents 32 when the locking members F are disposed in their normal positions. This will prevent the members F from swinging into open position in the event the trapped rat tries to squeeze its way out between the door D and the floor 11, as in doing so, the rat would force the door D upwardly to engage the flanges 36 with the hooks 37 to prevent the members F from movement. Also, the hooks 37 prevent the claws of the rat that is trapped from raising the member E and unlocking the door, since in so doing the rat will raise the end 24 of the door. However, when the unlocking member E is operated from the outside, the cams 33 will retract the locking members F, permitting the rat to open the door and enter the cage.

Referring to Figures 1, 5 and 6, I show a rod 38 that is disposed transversely across the space 25. This will constitute a hurdle which a small rat must pass when entering the cage. This will require the smaller rat to operate the unlocking member E and door D as it enters; and, also, will prevent escape of such undersize rats after being trapped. The rod 38 is removed when trapping only larger rats. However, the rod may be used when trapping larger rats, since the door D can swing far enough to allow such rats to enter over this rod.

Up-and-down sliding doors 39 are provided for closing the entrance openings when the trap devices are removed. This may be found necessary when destroying the rats and removing them from the cage.

Although I have described my trap in connection with rats, various other animals may be trapped thereby, such as small cats, polecats, etc. When using the traps around stock yards and feed lots, the cages may be made of considerable capacity and several trap devices C utilized.

Summary of operation

Assuming that the self-locking one-way entrance trap devices C are mounted on the end plates B of the cage A in the manner illustrated in Figure 1, the operation of the trap is summarized briefly as follows:

When a rat, or the like, is attracted to the trap by bait contained in the basket 15, the space 25 between the normally-locked door D and bottom 11 of the cage will encourage the rat to enter. As the rat moves inwardly, the unlocking member E will be raised, retracting the locking members F from engagement with the door D. This will allow the rat to move into the interior of the cage. Thereupon, the door D and unlocking member E will gravitate back into their normal positions, coming to rest on their respective stops 28 and 29. The counter-weights 35 will return the locking members F to normal positions, again locking the door D, and thus preventing escape of the rat.

I claim:

1. In a cage-type rat trap: a cage having an entrance opening; a movably-mounted door normally providing a partial closure over this opening, and leaving a space between the door and a floor of the cage through which a rat may at least partially insert its head; locking means pivotally mounted independently of the door and normally retaining the door in this partially-closed position; means operated by the rat as it endeavors to gain access through said space from the outside to unlock the door; the locking means being made to again hold the door in partially-closed position after the rat has entered the cage and the door has returned to normal position; and a rod extending transversely across the entrance opening, and disposed between the floor of the cage and the door to constitute a hurdle over which smaller rats must pass when entering the cage.

2. In a cage-type rat trap: a cage having an entrance opening; a swingably-mounted door normally providing a partial closure over this opening, and leaving a space between the door and a floor of the cage through which a rat may at least partially insert its head; locking means normally retaining the door in this partially-closed position; a swingably-mounted unlocking member disposed below the door and separate therefrom so as to be moved by the rat as it endeavors to gain access through said space from the outside; and means actuated by movement of the unlocking member to release the locking means and free the door.

3. In a cage-type rat trap: a cage having an entrance opening; a swingably-mounted door normally providing a partial closure over this opening, and leaving a space between the door and a floor of the cage through which a rat may at least partially insert its head; locking means normally retaining the door in this partially-closed position; a swingably-mounted unlocking member disposed below the door so as to be moved by the rat as it endeavors to gain access through said space from the outside; means actuated by movement of the unlocking member to release the locking means and free the door; the door and unlocking member both being swingable by gravity and independently of each other to their normal positions; and stops arranged to arrest downward movements of the door and unlocking members when they arrive at their normal positions.

4. In a cage-type rat trap: a cage having an entrance opening; a swingably-mounted door normally providing a partial closure over this opening, and leaving a space between the door and a floor of the cage through which a rat may at least partially insert its head; locking means normally retaining the door in this partially-closed position; a swingably-mounted unlocking member mounted independently of the door and being disposed below the door so as to be moved by the rat as it endeavors to gain access through said space from the outside; and means actuated by movement of the unlocking member to release the locking means and free the door; the door and unlocking member substantially paralleling one another when occupying their normal positions, and both being inclined downwardly toward the entrance opening of the cage.

5. In a cage-type rat trap: a cage having a floor and an entrance opening; a movably-mounted door normally providing a partial closure over this opening, and leaving a space between the door and the floor of the cage through which a rat may at least partially insert its head; a movably-mounted locking member having a detent normally overlying the door to retain the latter in its partially-closed position; a movably-mounted unlocking member disposed below the door and having a portion lying in the space between the door and the floor that will be moved by the rat as it endeavors to gain access through said space from the outside; and a cam on the locking member engaging with the unlocking member and made to swing the former to withdraw the detent from the door when the unlocking member is raised by the rat passing through the space between the door and the floor.

6. In a cage-type rat trap: a cage having a floor and an entrance opening; a movably-mounted door normally providing a partial closure over this opening, and leaving a space between the door and the floor of the cage through which a rat may at least partially insert its head; a movably-mounted locking member having a detent normally overlying the door to retain the latter in its partially-closed position; a movably-mounted unlocking member disposed below the door and having a portion lying in the space between the door and the floor that will be moved by the rat as it endeavors to gain access through said space from the outside; a cam on the locking member engaging with the unlocking member and made to swing the former to withdraw the detent from the door when the unlocking member is raised by the rat passing through the space between the door and the floor; and means for returning the locking member to its normal position after the rat has entered the cage so as to again lock the door.

7. In a cage-type rat trap: a cage having an entrance opening; a canopy-like shield arranged over the entrance opening; a swingably-mounted door normally carried by the shield and providing a partial closure over this opening, and leaving a space between the door and a floor of the cage through which a rat may at least partially insert its head; locking means carried by the shield and normally retaining the door in this partially-closed position; means carried by the shield and operated by the rat as it endeavors to gain access through said space from the outside to unlock the door by freeing the locking means therefrom; the locking means being swingable by gravity to again hold the door in partially-closed position after the rat has entered the cage and the door has returned to its normal position; and securing means detachably fastening the shield over the entrance opening of the cage; the shield, when detached, being insertable through the entrance opening of the cage so as to project into the interior of the latter; the same securing means being made to fasten the shield on the interior of the cage.

8. In a cage-type rat trap: a cage having a floor and an entrance opening; a movably-mounted door normally providing a partial closure over this opening, and leaving a space between a free end of the door and the floor of the cage through which a rat may at least partially insert its head; this door having an upstanding flange; a movably-mounted locking member having a hook-shaped detent normally overlying the flange on the door to retain the latter in its partially-closed position; the locking member normally being swingable to withdraw the detent from over the door; a movably-mounted unlocking member disposed below the door and having a portion lying in the space between the door and the floor that will be moved by the rat as it endeavors to gain access through said space from the outside; and a cam on the locking member engaging with the unlocking member and made to swing the former to withdraw the detent from over the door when the unlocking member is raised by the rat passing through the space between the door and the floor; the flange on the door being engageable with the hook on the detent to prevent the door from being opened when there is any tendency to raise the door prior to raising the unlocking member.

9. A cage-type rat trap comprising a cage having a floor and an entrance opening; a gravity actuated and downwardly inclined door hinged to the cage and extending into the opening to provide a partial closure therefor and leaving a space between a free end of the door and the floor through which a rat may at least partially insert its head; a gravity actuated door locking member having a detent normally overlying the door to retain it in its partially closed position; a gravity actuated and downwardly inclined door releasing member hinged to the cage and underlying the door; the door locking member having a cam acted upon by the door release member when the latter is moved; whereby the cam will swing the door locking member into a position for freeing the detent from the door and thus permitting the door to be swung into open position; a weight for returning the door locking member to normal position when the door releasing member is freed and returns to normal position by gravity; the detent again overlying the door to lock it against opening movement and the cam moving into a position to again be acted upon when the door releasing member is again raised by a rat.

HUGH C. McCURRIE.

REFERENCES CITED

The following references are of record in the file of this patent:

UNITED STATES PATENTS

| Number | Name | Date |
|---|---|---|
| 111,771 | Oliver | Feb. 14, 1871 |
| 128,802 | Lampkin | July 9, 1872 |
| 1,860,599 | Schlitz | May 31, 1932 |

FOREIGN PATENTS

| Number | Country | Date |
|---|---|---|
| 5,298 | Great Britain | of 1890 |